United States Patent
Convertino et al.

(10) Patent No.: US 9,400,779 B2
(45) Date of Patent: Jul. 26, 2016

(54) METHOD AND SYSTEM FOR CLASSIFYING REVIEWERS' COMMENTS AND RECOMMENDING RELATED ACTIONS IN IDEA-GENERATING SOCIAL MEDIA PLATFORMS

(71) Applicant: Xerox Corporation, Norwalk, CT (US)

(72) Inventors: Gregorio Convertino, Martina Franca (IT); Agnes Sandor, Meylan (FR)

(73) Assignee: XEROX CORPORATION, Norwalk, CT (US)

( * ) Notice: Subject to any disclaimer, the term of this patent is extended or adjusted under 35 U.S.C. 154(b) by 318 days.

(21) Appl. No.: 13/911,534

(22) Filed: Jun. 6, 2013

(65) Prior Publication Data

US 2014/0365207 A1    Dec. 11, 2014

(51) Int. Cl.
| | |
|---|---|
| G06F 9/44 | (2006.01) |
| G06F 9/45 | (2006.01) |
| G06F 17/27 | (2006.01) |
| G06F 17/24 | (2006.01) |

(52) U.S. Cl.
CPC .......... *G06F 17/2785* (2013.01); *G06F 17/243* (2013.01); *G06F 17/271* (2013.01); *G06F 17/2765* (2013.01); *G06F 17/2775* (2013.01); *G06F 8/10* (2013.01); *G06F 8/20* (2013.01); *G06F 8/30* (2013.01)

(58) Field of Classification Search
CPC .............. G06F 8/10; G06F 8/20; G06F 8/24; G06F 8/30; G06F 8/31; G06F 8/41
See application file for complete search history.

(56) References Cited

U.S. PATENT DOCUMENTS

| | | |
|---|---|---|
| 6,961,756 B1 | 11/2005 | Dilsaver et al. |
| 7,058,567 B2 | 6/2006 | Ait-Mokhtar et al. |
| 2002/0107722 A1 | 8/2002 | Laurin et al. |
| 2003/0036947 A1 | 2/2003 | Smith, III et al. |
| 2004/0158454 A1 | 8/2004 | Polanyi et al. |

(Continued)

OTHER PUBLICATIONS

Chuang et al., "Stance Classification on PTT Comments", 29th Pacific Asia Conference on Language, Information and Computation: Posters, pp. 27-36, Shanghai, China, Oct. 30-Nov. 1, 2015; <http://www.aclweb.org/anthology/Y/Y15/Y15-2004.pdf>.*

(Continued)

*Primary Examiner* — Thuy Dao
*Assistant Examiner* — Ben C Wang
(74) *Attorney, Agent, or Firm* — Fay Sharpe LLP

(57) ABSTRACT

A system and method for classifying comments are disclosed. The method includes receiving a collection of comments. Each of the comments in the collection includes text in a natural language and is associated with a previously-submitted idea submission which includes a description of an idea. The method further includes natural language processing each of the comments to identify dependencies (syntactic and/or semantic relations between text elements) in at least a part of the comment. Based on the identified dependencies, the comments are each automatically classified into one (or more) of a plurality of comment classes. The comment classes may include a first class for reaction to the content of the idea, a second class for expression of a commenter's judgment of an idea's value, and a third class for reaction to an idea generation process in which the associated idea submission is made. Information based on the assigned comment classes is output. For example, actions are proposed to use the comments according to their class.

16 Claims, 8 Drawing Sheets

(56) References Cited

U.S. PATENT DOCUMENTS

| | | | |
|---|---|---|---|
| 2005/0044135 | A1 | 2/2005 | Klausnitzer |
| 2007/0005344 | A1* | 1/2007 | Sandor et al. ............... 704/9 |
| 2007/0245297 | A1* | 10/2007 | Kuester ............. G06F 8/10 717/104 |
| 2009/0012970 | A1* | 1/2009 | Ziv et al. ............. 707/100 |
| 2009/0119095 | A1* | 5/2009 | Beggelman et al. ......... 704/9 |
| 2009/0265304 | A1 | 10/2009 | Ait-Mokhtar et al. |
| 2009/0288061 | A1* | 11/2009 | Silvera ............. G06Q 10/10 717/101 |
| 2010/0010800 | A1* | 1/2010 | Rehberg ............. 704/9 |
| 2010/0082331 | A1* | 4/2010 | Brun et al. ............. 704/9 |
| 2010/0153318 | A1* | 6/2010 | Branavan et al. ......... 706/12 |
| 2010/0332428 | A1* | 12/2010 | McHenry et al. ......... 706/12 |
| 2011/0029525 | A1* | 2/2011 | Knight ............. 707/737 |
| 2011/0093539 | A1 | 4/2011 | Laurin et al. |
| 2011/0154288 | A1* | 6/2011 | Kung ............. G06F 8/24 717/105 |
| 2012/0117115 | A1 | 5/2012 | Convertino et al. |
| 2012/0117484 | A1 | 5/2012 | Convertino et al. |
| 2012/0129145 | A1 | 5/2012 | Miller et al. |
| 2012/0245923 | A1 | 9/2012 | Brun |
| 2013/0091078 | A1* | 4/2013 | Allam ............. G06Q 10/0633 706/12 |
| 2013/0096909 | A1* | 4/2013 | Brun et al. ............. 704/9 |
| 2013/0132284 | A1 | 5/2013 | Convertino et al. |
| 2013/0173254 | A1* | 7/2013 | Alemi ............. 704/9 |
| 2013/0198196 | A1* | 8/2013 | Myslinski ............. 707/740 |
| 2013/0198750 | A1* | 8/2013 | Charif ............. G06F 8/20 718/102 |
| 2013/0218914 | A1* | 8/2013 | Stavrianou ......... G06F 17/30654 707/755 |
| 2013/0226847 | A1* | 8/2013 | Cruse et al. ............. 706/12 |
| 2014/0033069 | A1* | 1/2014 | Chegini et al. ............. 715/751 |
| 2014/0067369 | A1* | 3/2014 | Stavrianou ......... G06F 17/2775 704/9 |
| 2014/0067370 | A1* | 3/2014 | Brun ............. G06F 17/271 704/9 |
| 2014/0108307 | A1* | 4/2014 | Raghunathan et al. ......... 706/12 |
| 2014/0278985 | A1* | 9/2014 | Ramakrishnan et al. .. 705/14.54 |
| 2014/0279937 | A1* | 9/2014 | McHenry et al. ............. 707/689 |
| 2014/0304198 | A1* | 10/2014 | Oral et al. ............. 706/12 |
| 2014/0330832 | A1* | 11/2014 | Viau ............. 707/740 |
| 2014/0365206 | A1* | 12/2014 | Convertino et al. ......... 704/9 |
| 2014/0379729 | A1* | 12/2014 | Savage et al. ............. 707/748 |
| 2015/0010141 | A1* | 1/2015 | Sandhu ............. 379/266.07 |
| 2015/0019912 | A1* | 1/2015 | Darling et al. ............. 714/26 |

OTHER PUBLICATIONS

Yamasaki et al., "Social Popularity Score—Predicting Numbers of Views, Comments, and Favorites of Social Photos Using Annotations", 2014 ACM, Nov. 2014, pp. 3-8; <http://dl.acm.org/citation.cfm?id=2661722&CFID=771252146&CFTOKEN=66006656>.*

Iwai et al., "Sentence-based Plot Classification for Online Review Comments", 2014 IEEE, Aug. 2014, pp. 245-253; <http://ieeexplore.ieee.org/stamp/stamp.jsp?tp=&arnumber=6927549>.*

Ackerman, et al. "I-DIAG: From Community Discussion to Knowledge Distillation" AAAI Technical Report SS-03-01, in *Communities and technologies*, Marleen Huysman, Etienne Wenger, and Volker Wulf (Eds.). Kluwer, B.V., Deventer, The Netherlands, 307-325 (2003).

Austin, J.L. "How to do things with words" William James Lectures, 1955, pp. 1-174.

Chu-Carroll. "A Statistical Model for Discourse Act Recognition in Dialogue Interactions", AAAI Technical Report SS-98-01, 1998, pp. 1-6.

Danes. "Application of Text (Idea) Mining to Internet Surveys: Electronic Capture of the Structure of Ideas and Semantic Concepts", $2^{nd}$ Intl. Conf. on Electronic Business, Dec. 10-13, 2002, pp. 1-4.

Gurkan, et al. "Mediating debate through on-line large-scale argumentation: Evidence from the field", Information Sciences 180 (2010), pp. 3686-3702.

Hietala, et al. "Analysis of Student Decision-Making in Online Collaboration" Journal of Information Technology Impact, vol. 4, No. 2, 2004, pp. 99-120.

Hrastinski, et al. "A Review of Technologies for Open Innovation: Characteristics and Future Trends" Proc. of the $43^{rd}$ Hawaii Intl. Conf. on System Sciences, 2010, pp. 1-10.

Jeong, et al. "Semi-supervised speech act recognition in emails and forums", Proc. 2009 Conf. on Empirical Methods in Natural Language Processing, Aug. 6-7, 2009, pp. 1250-1259.

Jurafsky, et al. "Lexical, Prosodic, and Syntactic Cues for Dialog Acts", *Proceedings of ACL/COLING-98 Workshop on Discourse Relations and Discourse Markers*. 1998, pp. 114-120.

Kain, et al. "Facing the Open Innovation Dilemma—Structuring Input at the Company's Border" ICED Proc.18th Intern'l Conf. on Engineering Design (ICED11), vol. 1. pp. 487-498 (2011).

Kimbrough. "On automated message processing in electronic commerce and work support systems: speech act theory and expressive felicity", *ACM Transactions on Information Systems (TOIS)* 15(4), 1997: 321-367.

Kim, et al. "Mining and Assessing Discussions on the Web through Speech Act Analysis", Proc. of the ISWC'06 Workshop on Web Content Mining with Human Language Technologies, 2006, pp. 1-10.

Kim, et al. "Novel tools for assessing student discussions: Modeling threads and participant roles using speech act and course topic analysis" Proc. 2007 Conf. on Artificial Intelligence in Education, pp. 590-592.

Kriplean, et al. "Is this what you meant? Promoting Listening on the Web with Reflect", Proc. SIGCHI Conference on Human Factors in Computing Systems (CHI'12) May 5-10, 2012, pp. 1559-1568.

Kriplean, et al. "Supporting Reflective Public Thought with ConsiderIt" Proc. ACM 2012 Conf. on Computer Supported Cooperative Work (CSCW'12), Feb. 11-15, 2012, pp. 265-274.

Liccardi, et al. "CAWS: A wiki system to improve workspace awareness to advance effectiveness of co-authoring activities", Extended Abstracts on Human Factors in Computing Systems (CHI EA '07). ACM, New York, NY, USA, 2555-2560 (2007).

De Liddo, et al. "Cohere and XIP: Human Annotation Harnessing Machine Annotation Power" Proc. ACM 2012 Conf. on Comput. Supported Coop. Work (CSCW'12), Feb. 11-15, 2012, pp. 49-50.

De Liddo, et al. "Contested collective intelligence: rationale, technologies, and a human-machine annotation study" Proc.ACM 2012 Conf. on Comput. Supported Coop. Work (CSCW'12), 21 (4-5) pp. 417-448 (Oct. 2012).

Mukherjee, et al. "Modeling Review Comments", Proceedings of the 50th Annual Meeting of the Association for Computational Linguistics: Long Papers—vol. 1, 2012, pp. 320-329.

Pang, et al. "Opinion Mining and Sentiment Analysis" Foundations and Trends in Information Retrieval, vol. 2, Nos. 1-2, 2008, pp. 1-135.

Paukkeri, et al. "Framework for Analyzing and Clustering Short Message Database of Ideas" Proc. of I-Know'09 and I-Semantics'09, Sep. 2-4, 2009, pp. 239-247.

Qadir, et al. "Classifying Sentences as Speech Acts in Message Board Posts", Proc. 2011 Conf. on Empirical Method in Natural Language Processing (EMNLP 2011), pp. 748-758.

Rahwan, et al. "Representing and Classifying Arguments on Semantic Web" Knowledge Engineering Review 26(4): 487-511 (2011).

Reithinger, et al. "Dialogue Act Classification Using Language Models" Proceedings of EUROSPEECH-97, vol. 458. 1997, pp. 2235-2238.

Rus, et al. "Automated Discovery of Speech Act Categories in Educational Games" International Educational Data Mining Society (2012), pp. 25-32.

Swarts "Cooperative Writing: Achieving Coordination Together and Apart", Proceedings of the 22nd annual intern'l conf. on Design of communication: The engineering of quality documentation, 2004 ACM, pp. 83-89.

Thorleuchter "Essays on Text Mining for Improved Decision Making", PhD Thesis (2011), pp. 1-159.

Thorleuchter, et al. "Mining Ideas from Textual Information" Thorleuchter, Expert Systems with Applications: An International Journal Article 37(10) (2010): 7182-7188.

U.S. Appl. No. 13/400,263, filed Feb. 20, 2012, Stavrainou, et al.

(56) References Cited

OTHER PUBLICATIONS

U.S. Appl. No. 13/600,329, filed Aug. 31, 2012, Brun.
Underwood. "Recognizing Speech Acts in Presidential E-records" Georgia Tech Research Institute, Oct. 2008, pp. 1-115.
Westerski, et al. "Classifying and comparing community innovation in Idea Management Systems", *Decision Support Systems* ( Aug. 2012), pp. 1-34.
Westerski, et al. "The road from community ideas to organisational innovation: a life cycle survey of idea management systems" Int. J. Web Based Communities, vol. 7, No. 4, 2011, pp. 493-506.
Winograd. "A language/action perspective on the design of cooperative work", *Proceedings of the 1986 ACM conference on Computer-supported cooperative work*, Dec. 1986, pp. 203-220.
Zhang, et al. "Towards scalable speech act recognition in Twitter: tackling insufficient training data" *Proceedings of the Workshop on Semantic Analysis in Social Media* (pp. 18-27). Proc. Workshop on Semantic Analysis in Social Media, Association for Computational Linguistics, 2012, pp. 18-27.
"Opal (Opinion Analyser)", Retrieved from http://www.qi2mo.org/apps/opal-opinion-analyser/ , Downloaded Apr. 11, 2013, pp. 1-3.
Baccianella, et al. "Sentiwordnet 3.0: An Enhanced Lexical Resource for Sentiment Analysis and Opinion Mining" *Proceedings of the 7th Conf. on Intern'l Language Resources and Evaluation (LREC'10)*, May 2010, pp. 2200-2204.
Pang, et al. "Thumbs up? Sentiment Classification using Machine Learning Techniques" Proc. of the Conf. on Empirical Methods in Natural Language Processing, Jul. 2002, pp. 79-86.
Jouret, G. "Inside Cisco's Search for the Next Big Idea", Harvard Business Review, vol. 87(9), Sep. 2009, pp. 43-45, Retrieved from http://hbr.org/2009/inside-ciscos-search-for-the-next-big-idea/ar/1.
Brun, C. "Detecting opinions using deep syntactic analysis", Proc. Recent Advances in Natural Language Processing (RANLP), 2011, pp. 392-398.
Moghaddam, et al. "Opinion digger: an unsupervised opinion miner from unstructured product reviews" Proc. $19^{th}$ Conf. on Information and Knowledge management (CIKM'10), 2010, pp. 1825-1828.
Ait-Mokhtar, et al. "Robustness beyond shallowness: incremental dependency parsing" Special Issue of NLE Journal, 2002, pp. 121-144.
Ait-Mokhtar, "Incremental finite-state parsing" Proc. $5^{th}$ Conf. on Applied natural language processing (ANLP'97), 1997, pp. 72-79.
Ait-Mokhtar, et al. "Subject and Object dependency extraction using finite-state transducers" Proc. of $35^{th}$ Conf. of the Assoc. for Computational Linguistics (ACL'97) Workshop on Information Extraction and the Building of Lexical Semantic Resources for NLP Applications, 1997, pp. 71-77.
Hagege, et al. "XTM: A robust temporal processor" CICLing Conf. on Intelligent Text Processing and Computational Linguistics, Feb. 17-23, 2008, pp. 231-240.
Ritter, et al. "Unsupervised Modeling of Twitter Conversations" in Human Language Technologies: The 2010 Annual Conference of the North American Chapter of the Association for Computational Linguistics (HLT '10). Association for Computational Linguistics, Stroudsburg, PA, USA, 172-180 (2010).
Radev, et al. "Intelligent Text summarization", Reports on the AAAI Spring Symposium, Mar. 23-25, 1998, AI Magazine (1999) vol. 20, No. 3, p. 84.
Twitchell, et al., "Using Speech Act Theory to Model Conversations for Automated Classification for Automated Classification and Retrieval," Proceedings to the $9^{th}$ International Working Conference Language Action Perspective Communication Modelling, pp. 121-130 (2004).
U.S. Appl. No. 61/819,632, filed May 5, 2013, Viau.

\* cited by examiner

METHOD AND SYSTEM FOR CLASSIFYING REVIEWERS' COMMENTS AND RECOMMENDING RELATED ACTIONS IN IDEA-GENERATING SOCIAL MEDIA PLATFORMS

CROSS REFERENCE TO RELATED PATENTS AND APPLICATIONS

Cross-reference is made to U.S. Patent Pub. No. 2014/0365206 A1, published Dec. 11, 2014, entitled METHOD AND SYSTEM FOR IDEA SPOTTING IN IDEA-GENERATING SOCIAL MEDIA PLATFORMS, by Gregorio Convertino and Ágnes Sandor, the disclosure of which is incorporated herein by reference in its entirety.

BACKGROUND

The exemplary embodiment relates to idea generation and finds particular application in connection with a system and method for classification of reviewer comments on ideas.

Idea-generating social media platforms include Idea Management Systems (IMS's), such as employee and customer suggestion systems, Q&A sites, argumentation systems, eGovernment sites and other similar computer-supported systems where ideas are shared, discussed, and selected by a community of users. Examples of such platforms are those used by a community for the purpose of innovation. The innovation community may include the employees, partners, or customers of a company or the members of a civic community, city, region, or nation. The ideas submitted may be proposed solutions to an existing problem or proposals for a new item. For example, the innovation community proposes and selects new services or products for an organization with which it is associated.

Ideas are often submitted as free text and are reviewed by other members of the community. The reviewers may annotate the submitted ideas with their comments on the ideas, also as free text. The content shared by the community is thus often in the form of unstructured data, such as textual descriptions of ideas and textual annotations of reviewer comments associated with an idea.

One problem with such platforms is that a large quantity of informal content has to be sifted through to identify content that conveys value. At the level of the community or organization, the unstructured content in the platforms remains underexploited, which leads to information loss. As a result, less informed decisions are taken by the community or organization. Another problem is that individual users contributing to the system often lack experience in generating contributions, such as idea descriptions. These often lack emphasis on the core of the idea, thus more time and effort is involved. Additionally, in the case of idea annotations there is often a lack of conformity among comments, votes, tags, idea status, and timestamps.

Comments may provide valuable input for the evaluation of the ideas and may also add relevant content to the ideas. However, existing systems are not able to mine the comments and make use of the evaluations and suggestions that they contain.

INCORPORATION BY REFERENCE

The following references, the disclosures of which are incorporated by reference in their entireties, are mentioned:

Information sharing systems are disclosed, for example, in U.S. Pub. No. 20120117115, published May 10, 2012, entitled SYSTEM AND METHOD FOR SUPPORTING TARGETED SHARING AND EARLY CURATION OF INFORMATION, by Gregorio Convertino, et al.; U.S. Pub. No. 20120117484, published May 10, 2012, entitled SYSTEM AND METHOD FOR PROVIDING MIXED-INITIATIVE CURATION OF INFORMATION WITHIN A SHARED REPOSITORY, by Gregorio Convertino, et al.; U.S. Pub. No. 20120129145, published May 24, 2012, entitled SYSTEM FOR FOSTERING INNOVATION AMONG A GROUP OF USERS, by William Miller, et al.; U.S. Pub. No. 20110093539, published Apr. 21, 2011, entitled SYSTEM AND METHOD FOR INNOVATION AND IDEA MANAGEMENT, by Andre Laurin, et al.; U.S. Pub. No. 20050044135, published Feb. 24, 2005, entitled METHOD FOR MANAGING AND PROVIDING AN IDEA MANAGEMENT SYSTEM, by Norbert Klausnitzer; U.S. Pub. No. 20020107722, published Aug. 8, 2002, entitled IDEA MANAGEMENT, by Andre Laurin, et al.; U.S. Pub. No. 20030036947, published Feb. 20, 2003, entitled SYSTEMS AND METHODS FOR SUBMISSION, DEVELOPMENT AND EVALUATION OF IDEAS IN AN ORGANIZATION, by William E. Smith, III, et al.; U.S. Pat. No. 6,961,756, to Dilsaver; and U.S. application Ser. No. 13/300,467, filed Nov. 18, 2011, entitled SYSTEM AND METHOD FOR MANAGEMENT AND DELIBERATION OF IDEA GROUPS, by Gregorio Convertino, et al.

Opinion mining and opinion detection systems are disclosed, for example, in U.S. Pub. No. 20120245923, published on Sep. 27, 2012, entitled CORPUS-BASED SYSTEM AND METHOD FOR ACQUIRING POLAR ADJECTIVES, by Caroline Brun; U.S. Pub. No. 20130096909, published on Apr. 18, 2013, entitled SYSTEM AND METHOD FOR SUGGESTION MINING, by Caroline Brun et al.; U.S. application Ser. No. 13/400,263, filed on Feb. 20, 2012, entitled SYSTEM AND METHOD FOR PROVIDING RECOMMENDATIONS BASED ON INFORMATION EXTRACTED FROM REVIEWERS' COMMENTS, by Anna Stavrianou, et al; U.S. application Ser. No. 13/600,329, filed on Aug. 31, 2012, entitled LEARNING OPINION-RELATED PATTERNS FOR CONTEXTUAL AND DOMAIN-DEPENDENT OPINION DETECTION, by Caroline Brun; U.S. Pub. No. 20090265304, published Oct. 22, 2009, entitled METHOD AND SYSTEM FOR RETRIEVING STATEMENTS OF INFORMATION SOURCES AND ASSOCIATING A FACTUALITY ASSESSMENT TO THE STATEMENTS by Aït-Mokhtar, et al., and U.S. Pub. No. 20040158454, entitled SYSTEM AND METHOD FOR DYNAMICALLY DETERMINING THE ATTITUDE OF AN AUTHOR OF A NATURAL LANGUAGE DOCUMENT, by Livia Polanyi, et al.; Caroline Brun, "Detecting Opinions Using Deep Syntactic Analysis," Proc. Recent Advances in Natural Language Processing (RANLP), Hissar, Bulgaria (2011); Moghaddam, et al., "Opinion Digger: An Unsupervised Opinion miner from Unstructured Product Reviews," in Proc. $19^{th}$ Conf. on Information and Knowledge Management (CIKM'10), 2010.

BRIEF DESCRIPTION

In accordance with one aspect of the exemplary embodiment, a method for classifying comments includes receiving a collection of comments. Each of the comments in the collection includes text in a natural language and is associated with a previously-submitted idea submission which includes a description of an idea. The method further includes natural language processing each of the comments to identify dependencies in at least a part of the comment. Based on the identified dependencies, the comments are each automatically classified according to a plurality of comment classes. Information based on the assigned comment classes is output. At least one of the natural language processing, classifying, and outputting may be performed with a computer processor.

In accordance with another aspect of the exemplary embodiment, a system for classifying comments includes a linguistic processing component which natural language processes each of the comments in a collection of comments to identify dependencies in at least a part of the comment. Each of the comments in the collection includes text in a natural language and is associated with a previously-submitted idea submission which includes a description of an idea. A comment classification component classifies the comments into a plurality of predefined comment classes based on the identified dependencies. An output component outputs information based on the assigned comment classes. A processor implements the linguistic processing component, comment classification component, and output component.

In accordance with another aspect of the exemplary embodiment, a method for generating a system for classifying comments includes storing a set of terms in non-transitory memory for each of a set of domain dependent concepts and a set of terms for each of a plurality of domain-independent concepts. For each of a plurality of comment classes, the method includes generating at least one pattern for assigning a textual comment on an idea submission to the class based on the occurrence of a specified syntactic relation in the comment, at least some of the patterns specifying that a term in one of the domain-dependent or domain-independent concepts be a syntactic relation with another term in the comment. The patterns are stored in non-transitory memory for application to textual comments by a comment classification component. At least one of the storing terms and storing patterns may be performed with a computer processor.

DETAILED DESCRIPTION

Aspects of the exemplary embodiment relate to an idea management system which analyses idea submissions, in particular, comments on the ideas submitted by members of an innovation community. In some cases, the innovation community proposes and selects new services or products for an organization with which it is associated. The community may include the organization's employees, partners, or customers. However, other idea-generating social media platforms that have similar idea creation and deliberation functionalities can also be enhanced by the methods and systems proposed herein.

Figure 1:
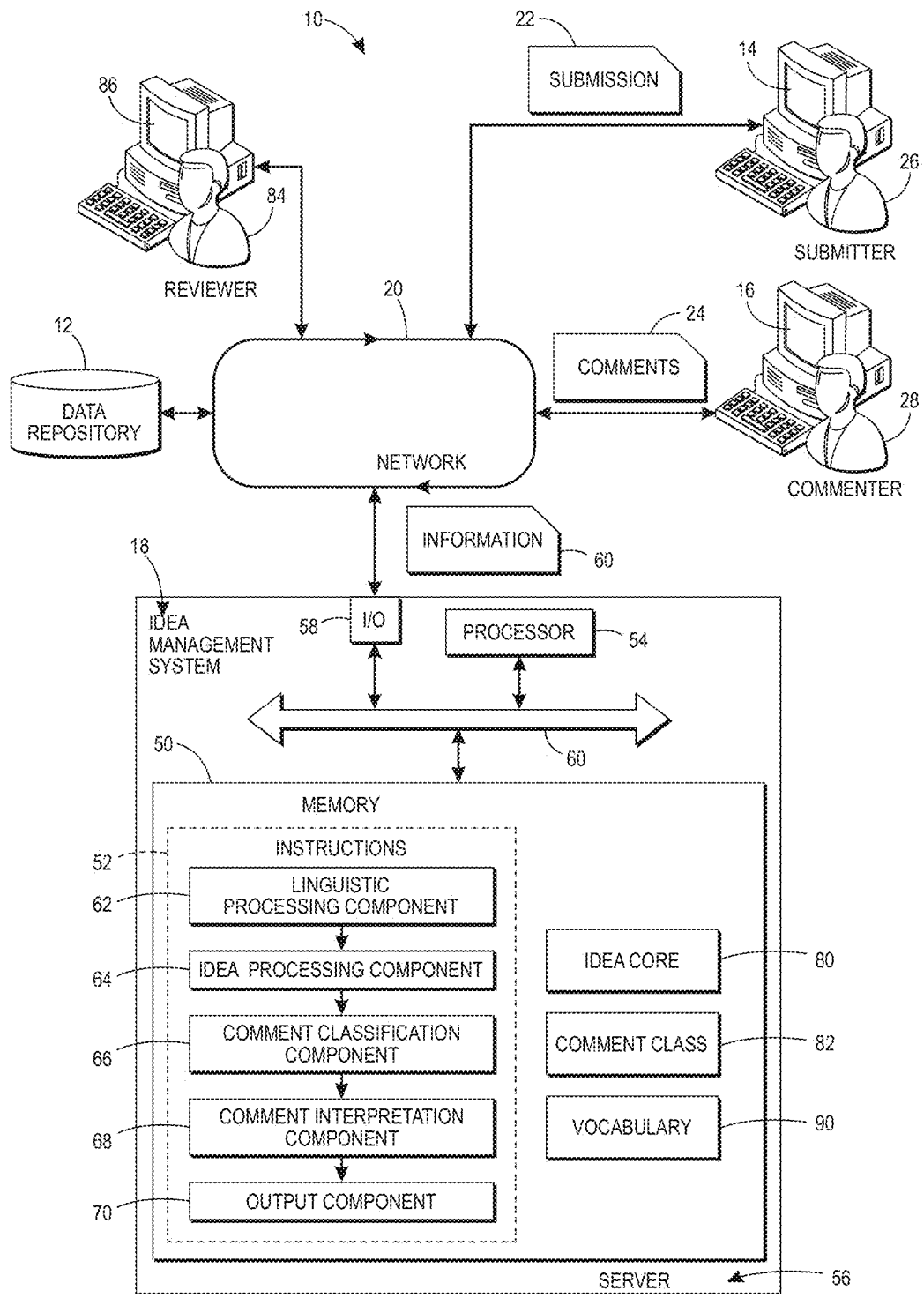
FIG. 1 is a functional block diagram of an environment in which an idea management system operates in accordance with one aspect of the exemplary embodiment.

FIG. 1 is a block diagram illustrating an environment 10 for supporting sharing information and classification of annotations, in accordance with one embodiment. A data repository 12 stores shared content, such as submitted ideas (suggestions) and comments on the ideas. The ideas and respective comments are generated by submitters on associated user devices 14, 16, etc. An idea management system (IMS) 18 processes the shared content and outputs information based thereon. In particular, the idea management system 18 automatically classifies textual annotations (comments) on ideas according to the commenter's reaction to the idea. The idea management system may also provide an analysis of the submitted ideas and title, as described in above-mentioned copending Patent Pub. No. 2014/0365206, entitled METHOD AND SYSTEM FOR IDEA SPOTTING IN IDEA-GENERATING SOCIAL MEDIA PLATFORMS.

In an exemplary embodiment, each user device 14, 16, etc. is a Web-enabled device that executes a Web browser and/or email program, which supports interfacing tools and information exchange with a Web server that is linked to the system 18. A wired or wireless digital data communications network 20, such as the Internet or a local intranet, provides an infrastructure for exchange of digital information. The network 20 provides interconnectivity between the user devices 14, 16, data repository 12, and system 18. Users can access and upload content, such as idea submissions 22 and comments 24 on the submitted ideas, and the like to the network 20, which are then stored in the data repository 12 and processed by the system 18.

User devices 14, 16 can include desktop, laptop, or tablet computers, handheld devices, such as mobile telephones and mobile Internet devices, and other computing devices capable of communicating via the network.

The users form an innovation community. Some of the users serve as submitters of ideas. One or more of the users may be tasked with providing comments on submissions of other users, or all users may serve as commenters. The ideas submitted may include suggestions for solving an existing problem, suggestions for modifications to an item, such as a product, service, or company procedure, suggestions for a new item, such as a product service, or company procedure, or the like. The comments 24 may relate to any aspect of the submission. FIG. 1 shows a submitter 26, who generates an idea submission 22 and a commenter 28, who provides comments 24 on the submission, i.e., the comments are provided by a different person 28 from the person 26 who generated the idea submission. It is to be appreciated that in an innovation community there may be a large number of submitters and a large number of commenters. In some cases submitters may serve as commenters on the ideas of others, and vice versa.

Figure 2:
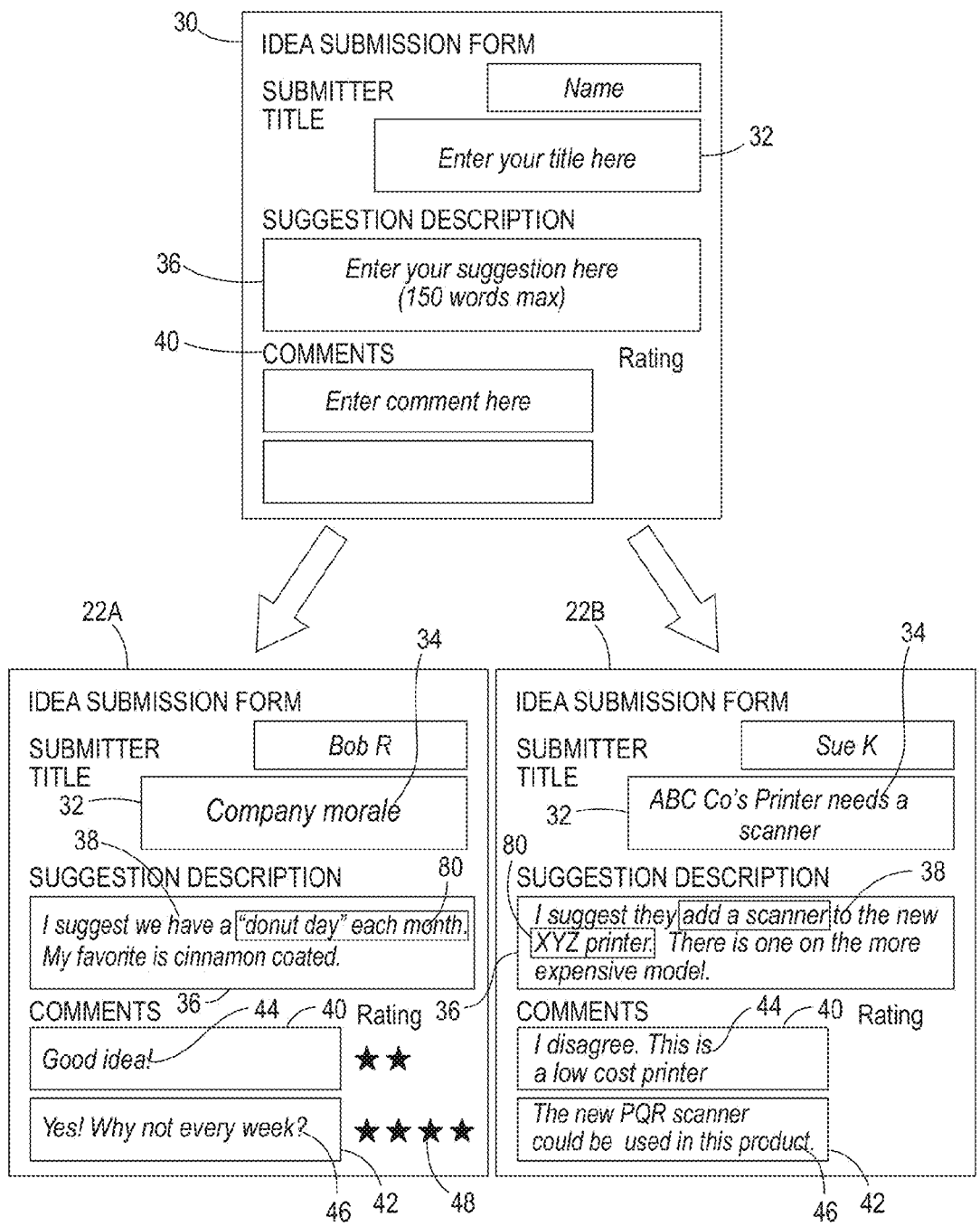
FIG. 2 illustrates a template idea submission form and a completed submission with comments.

With reference also to FIG. 2, the idea submissions 22A, 22B may be submitted in response to a request for submissions on a given topic or may be submitted without any specific request. Submitters 26 may generate their submission by adding information to one or more fields of a template submission form 30. One of the fields may be a title field 32, in which the submitter provides a title 34 for the idea, if this has not been decided in advance. Another of the fields may be a suggestion field 36 in which the user enters a textual description 38 of the idea. In some embodiments, commenters 28 may add comments to the same form 30, e.g., the form may include one or more comments field(s) 40, 42 for one or more commenters to add their textual comments 44, 46. Alternatively, commenters may enter their textual comments on a separate comments form. The commenter may also provide a rating 48 of the idea (on a scale of, for example, 1 to 5 stars, where 5 represents a highly positive rating and 1 represents a highly negative rating).

Returning to FIG. 1, the idea management system 18 includes memory 50 which stores instructions 52 for performing the exemplary method and a processor 54 in communication with the memory for executing the instructions. The system 18 may be hosted by a suitable computing device or devices, such as the illustrated server computer 56. The system communicates with the network 20 via a network interface 58. Hardware components 50, 54, 58 of the system may communicate via a data control bus 60.

In one embodiment, the system 18 is hosted by a computing device within the organization that requests the idea submissions. In other embodiments, the processing of the submissions may be performed by an external web service and the results returned to the requesting organization.

The host computer 56 may be a PC, such as a desktop, a laptop, palmtop computer, portable digital assistant (PDA), server computer, cellular telephone, tablet computer, pager, combination thereof, or other computing device capable of executing instructions for performing the exemplary method. The memory 50 may represent any type of non-transitory computer readable medium such as random access memory (RAM), read only memory (ROM), magnetic disk or tape, optical disk, flash memory, or holographic memory. In one embodiment, the memory 50 comprises a combination of random access memory and read only memory. In some embodiments, the processor 54 and memory 50 may be combined in a single chip. The network interface 58 allows the computer to communicate with other devices via the computer network 20, and may comprise a modulator/demodulator (MODEM) a router, a cable, and and/or Ethernet port. Memory 50 stores processed data as well as instructions for performing the exemplary method described below.

The digital processor 54 can be variously embodied, such as by a single-core processor, a dual-core processor (or more generally by a multiple-core processor), a digital processor and cooperating math coprocessor, a digital controller, or the like. The digital processor 54, in addition to controlling the operation of the computer 56, executes instructions stored in memory 50 for performing the method outlined in FIG. 3.

As illustrated in FIG. 1, the instructions 52 may include some or all of the following: a natural language linguistic processing component 62, an idea processing component 64 for identifying a core of the idea, a comment classification component (classifier) 66, a comment interpretation component 68, and an information output component 68. The linguistic processing component 62 may include a natural language parser which processes at least one of the title 34, the free text description 38 of the suggestion and the free text comments 44, 46 to identify words and dependencies (syntactic and/or semantic relations) between words of the text. The idea processing component 64 identifies a probable core 80 of the idea from the suggestion 38 and optionally compares this with the title 34 of the idea. The comment classification component 66 classifies the comments based on the processed text and assigns one or more class labels 82 to the comments. The classes (reaction types) may be selected from a predefined set of classes which express the commenter's reaction to the idea. Comment classes may include some or all of the following: a first class for comments conveying additional ideas; a second class for evaluative comments (agree/disagree, positive/negative, pros and cons), and a third class for comments that concern the idea status within the idea management system. Classes may have subclasses. For example, the evaluative comments class may have a 'positive' comments subclass and a 'negative' comments subclass, etc.

Depending on the comment class, the comment interpretation component 68 may suggest or implement one of two or more different actions. For example, evaluative comments may be turned into votes, and/or comments conveying additional ideas may be appended to the idea description. In one embodiment, the actions are recommended to a reviewer 84 on an associated user interface 86, e.g., a display device of a client computing device analogous to devices 14, 16. The comment interpretation component 68 may include a tool for refining the content, which is called on when the comment is assigned to the first comment class, a tool for assessing the value of the idea, which is called on when the comment is assigned to the second comment class, and a tool for managing the process, when the comment is assigned to the third comment class. Comments classed as unclassified may be ignored.

In one embodiment, the classification component 66 is rule based, i.e., applies a set of grammar rules to the processed text and depending on the output of the applied rules, determines a class. The rules may include patterns which when met by text of a comment, return a class and/or subclass for the textual content. In another embodiment, the classification component employs a probabilistic classifier model (or models) trained to output a class based on the processed text. Such a classifier model may have been trained on a set of training comments that are each manually labeled with a respective one of the set of class labels.

The information output component 58 outputs information 60 based on one or more of the identified core, classification of the comments and/or the output of the processing of the comments.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 18. Since the configuration and operation of programmable computers are well known, they will not be described further.

Figure 3:
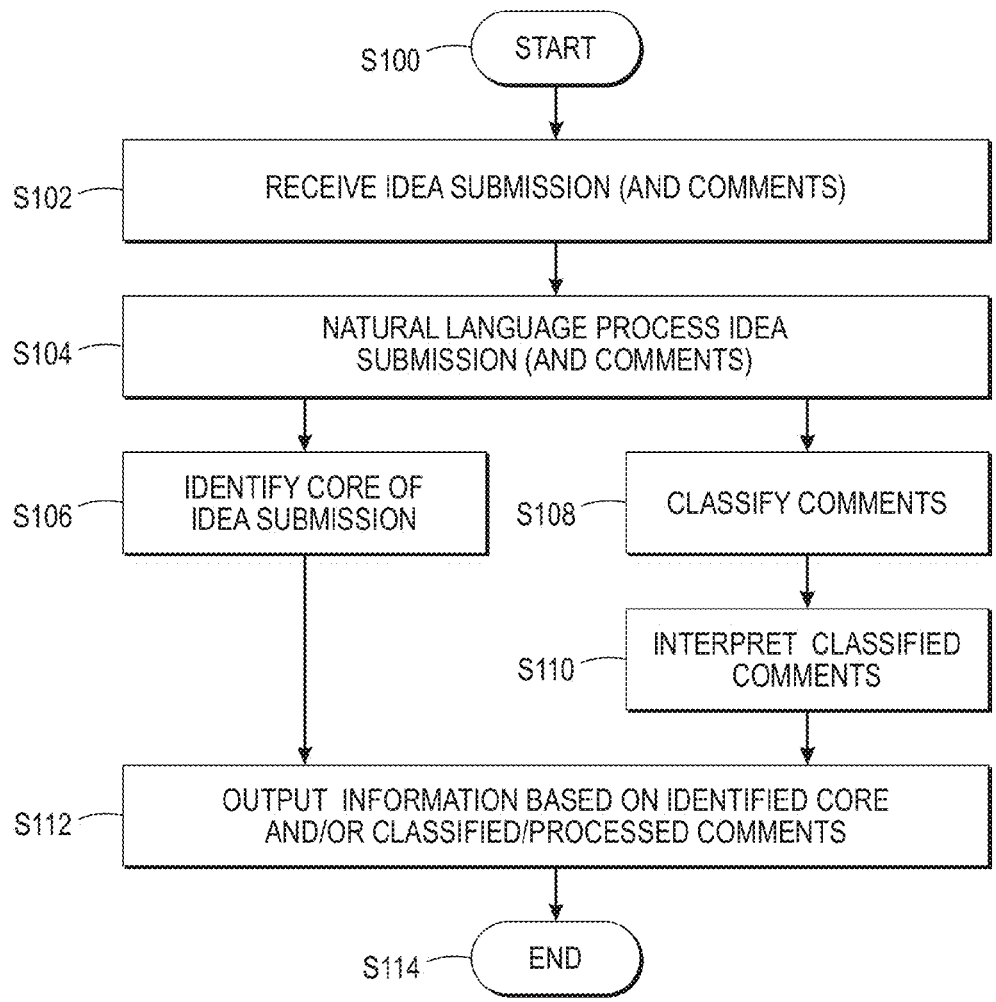
FIG. 3 is a flow chart illustrating a method for classification of textual annotations in accordance with another aspect of the exemplary embodiment.

With reference to FIG. 3, a method of classifying comments (and optionally identifying an idea core) is shown, which may be performed with the system of FIG. 1. The method begins at S100.

At S102, idea submissions and/or associated comments on the idea submissions are received by the system.

At S104, the submissions and/or comments are natural language processed with component 52.

S106, a core of the idea may be identified with the idea processing component 64.

At S108, the natural language processed comments may be classified with comment classification component 66.

At S110, the classified comments may be processed with interpretation component 68, and actions to be recommended may be generated, based on the assigned class.

At S112, information based on the identified core and/or classification/processing of the comments is output from the system by the output component. This may include proposing actions to use the comments according to their class. For example, comments that are reactions to the content of the idea can help users with managing or refining the content, comments that are judgments of the idea's value can help users with judging or selecting the idea (e.g., can be turned into votes), and comments that are reactions to the idea generation process can help users with updating the idea status or manage the process.

The method ends at S114.

As will be appreciated, the steps of the method need not all proceed in the order illustrated and fewer, more, or different steps may be performed. Additionally, the identification of the core S106 and classification/interpretation of comments S108/S110 need not all be performed in the method. For example, in one method, S108 and S110 are omitted, the core is identified at S106 and the information output may be the identified core and/or a proposed title which is based on the identified core. In another method, S106 is omitted and the information output is based on the classifications of the comments and/or their interpretation.

The method illustrated in FIG. 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 56, (for example, an internal hard drive of RAM), or may be separate (for example, an external hard drive operatively connected with the computer 56), or may be separate and accessed via a digital data network such as a local area network (LAN) or the Internet (for example, as a redundant array of inexpensive of independent disks (RAID) or other network server storage that is indirectly accessed by the computer 56, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, can be used to implement the idea management method. As will be appreciated, while the steps of the method may all be computer implemented, in some embodiments one or more of the steps may be at least partially performed manually.

Figure 4:
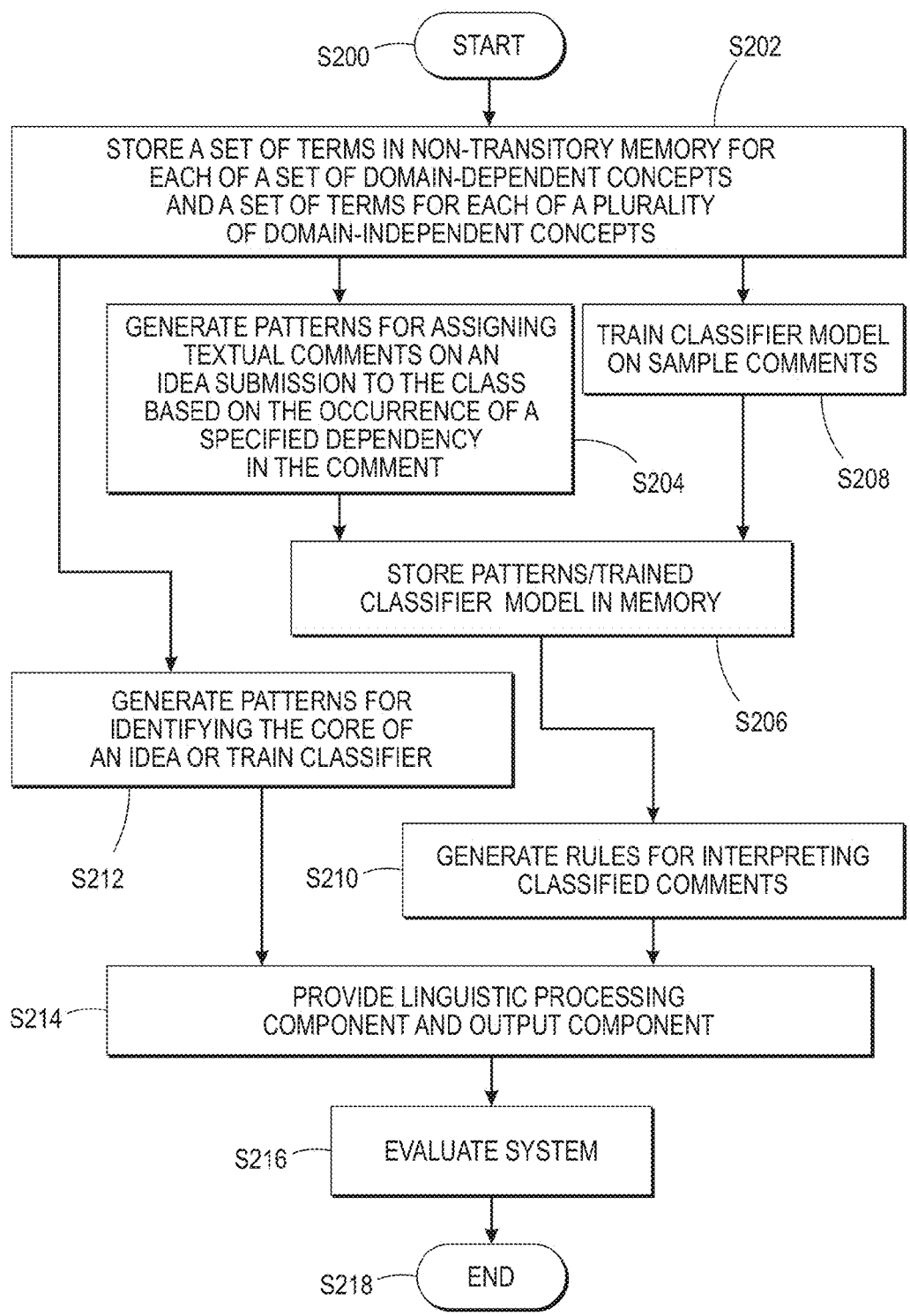
FIG. 4 is a flow chart illustrating a method for forming the comment classification system of FIG. 1.

FIG. 4 illustrates a method for generating the system for identifying the core of an idea and/or for classifying comments. The method begins at S200.

At S202, a set of terms is stored in memory 50 for each of a set of domain dependent concepts and a set of terms is stored for each of a plurality of domain-independent concepts.

At S204, for each of a plurality of comment classes, one or more patterns is generated for assigning a textual comment on an idea submission to the class based on the occurrence of a specified syntactic relation in the comment. At least some of the patterns specify that a term in one of the domain-dependent or domain-independent concepts is a syntactic relation with another term in the comment for the pattern to fire on the comment.

At S206 the patterns are stored in memory 50 for application to textual comments by the comment classification component 66.

Alternatively, at S208, a classifier model is trained on a set of manually labeled sample comments (each label corresponding to one of the comment classes). Any suitable machine learning method can be used, such as support vector machines, linear regression, or the like. The classifier model is stored in memory 50 at S206, for applying by the comment classification component.

At S210, rules may be generated and stored in memory for interpretation of some or all of the comments, which are dependent on the class which is assigned to the comment.

Additionally or alternatively, at S212 patterns are generated and stored in memory 50 for identifying the core of an idea based on the idea submission description.

At S214 a linguistic processing component, output component, processor, and any other components of the system that are needed may be provided.

At S216, the system may be tested on a set of comments/idea submissions to determine if the respective patterns/vocabulary are providing a desired level of precision, and if not, additional and/or different patterns and/or concept terms may be developed or patterns modified and the system reevaluated.

The method ends at S218.

While part of the method of FIG. 4 may be performed manually, part may be computer implemented, as for the method of FIG. 3, such as the storing terms and storing patterns and/or classifier model learning. As will be appreciated, the method need not include those steps which are related to identifying the core for a system which identifies the core but does not classify comments, and vice versa in the case of a system for classifying comments which does not identify the idea core.

Further details of the system and methods will now be provided.

Receiving Submissions and Comments (S102)

In some embodiments, the idea submissions may be requested by someone in the organization, e.g., in the case where the submitters are employees. The request may be limited to a subset of the employees, such as the employees in a particular department. In other embodiments, the entire workforce may be asked to provide their suggestions. For example, a facilitator may communicate a request to employees for their ideas about a new product, process, or service that the company is considering introducing. The request may be limited to a particular product or service or may be open to any idea that the employees may want to propose.

When customers are the submitters, they may be invited to propose ideas for new products or services or for ideas on existing products and services. In some cases, the customers may be limited to those who have purchased a product or service on which they are being asked for suggestions. In other embodiments, they may be contacted through the company website, in stores where the company's goods/services are sold, or through other marketing channels. In the case of a Q&A website, provision is made so that one user may submit a description of a problem and other users may provide answers (submissions) and in some cases, comments on those answers.

The number of commenters who provide suggestions may be up to the number of other members of the community. In other embodiments, only a limited subset of the community is permitted to make comments.

Submissions and/or comments may be provided in one or more different formats, such as wiki pages, posts, emails, text messages, instant messages, tweets, voice messages, faxes, or the like. In the illustrated embodiment, a plurality of commenters may provide their comments on the same idea suggestion using electronic form 30.

Linguistic Processing (S104)

The linguistic processing component 62 processes the text of the submission and/or comments. The linguistic processing component 62 may be based on a general-purpose parser with additional grammar rules added to identify the patterns useful herein. During parsing of the document, the parser annotates the text strings of the document with tags (labels) which correspond to grammar rules, such as lexical rules and syntactic and/or semantic dependency rules, such as SUBJ (a dependency between the subject of the sentence and the predicate verb) and OBJ (a dependency between the object of the sentence and the predicate verb). The lexical rules define features of terms such as words and multi-word expressions. Syntactic rules describe the grammatical relationships between the words, such as subject-verb, object-verb relationships. Semantic rules include rules for extracting semantic relations such as co-reference links. The application of the rules may proceed incrementally, with the option to return to an earlier rule when further information is acquired. The labels applied by the parser may be in the form of tags, e.g., XML tags, metadata, log files, or the like.

The following disclose a parser which is useful for syntactically analyzing an input text string in which the parser applies a plurality of rules which describe syntactic properties of the language of the input text string: U.S. Pat. No. 7,058,567, issued Jun. 6, 2006, entitled NATURAL LANGUAGE PARSER, by Aït-Mokhtar, et al.; Aït-Mokhtar, et al., "Robustness beyond Shallowness: Incremental Dependency Parsing," Special Issue of NLE Journal (2002). Similar incremental parsers are described in Aït-Mokhtar "Incremental Finite-State Parsing," in Proc. 5th Conf. on Applied Natural Language Processing (ANLP'97), pp. 72-79 (1997); Aït-Mokhtar, et al., "Subject and Object Dependency Extraction Using Finite-State Transducers," in Proc. 35th Conf. of the Assoc. for Computational Linguistics (ACL'97) Workshop on Information Extraction and the Building of Lexical Semantic Resources for NLP Applications, pp. 71-77 (1997); and Caroline Hagège and Xavier Tannier, "XTM: A robust temporal processor," CICLing Conference on Intelligent Text Processing and Computational Linguistics, Haifa, Israel, Feb. 17-23, 2008. The syntactic analysis may include the construction of a set of syntactic relations from an input text by application of a set of parser rules. Exemplary methods are developed from dependency grammars, as described, for example, in Mel'čuk I., "Dependency Syntax," State University of New York, Albany (1988) and in Tesnière L., "Elements de Syntaxe Structurale" (1959) Klincksiek Eds. (Corrected edition, Paris 1969). An exemplary parser is the Xerox Incremental Parser (XIP).

In addition to the rules applied by a conventional parser, the linguistic processing component (and/or idea processing component and/or comment classification component) may apply rules which identify and tag domain-dependent and domain-independent concepts and apply a set of patterns which specify semantic relations involving these concepts.

In one embodiment, a set of patterns adapted to core analysis or comment classification is employed for identifying syntactic and/or semantic relations (dependencies) between particular grammatical structures and/or morpho-syntactic forms and words representing particular domain-independent or domain-dependent concepts. Exemplary patterns are described in more detail below.

The domain-dependent concepts may be customized for each application and may be stored in a vocabulary 90, such as lexicon. In the lexicon, each concept may be associated with a set of terms which represent it. Each term can be a word or phrase. One domain-dependent concept may relate to the organization, such as a company, to which the suggestions are addressed. As an example, the name of the company may be used as the title of the concept and the terms representing it may include some or all of: variants of its name, its divisions, its products, its employees, and its activities. When terms in the domain-specific lexicon 90 are identified in the text being processed, they are labeled with the appropriate concept label (e.g., COMPANY or PRODUCT).

Domain-independent concepts may also be stored in the lexicon 90, or a separate lexicon, which relate to the task being performed by the IMS. For example, in the case of identifying the core idea in the suggestion 38, the domain-independent concepts may include a PERFORMATIVE concept, which includes terms often verbs, which are often found in combination with an action to be performed, and an IDEA concept which is associated with terms relating to an idea assertion. Examples of the PERFORMATIVE concept may include verbs such as suggest, propose, and recommend. Examples of the IDEA concept include terms such as idea, suggestion, proposition, proposal, and the like.

In the case of classification of comments, the domain-independent concepts may include some or all of the following concepts and terms:

IDEA: idea, suggestion, proposition, proposal, concept, thought, brainwave, notion, initiative, plan, inspiration, etc.

SIMILAR: another, related, same, similar, comparable, etc.

PROCESS: accept, assign, process, hold, administer, etc.

AGREE: agree, concur, right, yes, perfectly, agreement, etc.

DISAGREE: disagree, differ, oppose, wrong, no, disagreement

LACK: need, require, lack, want, should

SUGGESTION: suggest, advise, add, propose, submit, put forward, recommend, suggestion, etc.

GOOD: good, lovely, splendid, wonderful, cool, fantastic, great, decent, useful, excellent, clever, etc.

BAD: bad, poor, awful, terrible, flawed, rotten, unpleasant

Some of these concepts, such as the IDEA and SUGGESTION concepts, may also be used for identifying the idea core. The creation of the sets of concept terms can be performed manually or semi-automatically, for example using a glossary of terms used within the company for the ORGANIZATION concept. Manually selected terms can be supplemented with synonyms from a thesaurus. Lexical items (individual words) may also be stored.

The example patterns described below include those which identify a semantic relation, i.e., a specified relationship between two text elements in a sentence (such as SUBJ or OBJ) where at least one of the text elements is tagged with one of the concepts. Each text element can include one or more words. Other useful patterns identify syntactic relations in which specific verb forms are used.

Core Analysis (S106)

The identification of the core of an idea (idea spotting) involves automatically detecting the idea core(s) within idea descriptions. In some embodiments, only a part of the description is analyzed for identifying the core of the idea, such as the first one or two sentences. In other embodiments, the entire description is analyzed. In yet other embodiments, the sentences are analyzed in turn until one of the sentences is determined to include a core.

Idea spotting can be based on analyzing idea descriptions 38 in terms of speech act theory (first developed in John Langshaw Austin: How to Do Things With Words. Cambridge Mass. (1962). According to speech act theory, speakers perform illocutionary acts by utterances using special linguistic structures. Conveying ideas is performed by directive speech acts, which are defined as acts that cause the hearer to take a particular action. A "linguistic structure" refers generally to a word or phrase and the linguistic tags that have been applied by the parser, such as part of speech, gender, tense, etc.

Some linguistic structures are ambiguous with respect to the illocutionary act that they convey, i.e., the same structure can convey different illocutionary acts depending on the communicative situation. For example a question, such as "Could the new printer include a scanner?" may be an inquiry, a request or a suggestion. In the case of detecting the core(s) of an idea, such ambiguity is resolved by the predefined communicative situation of the IMS as a space for proposing ideas. As a consequence, once a particular linguistic structure is identified in the context of the participants as conveying a directive speech-act, it is considered that the identified linguistic structure conveys a suggestion to be acted on, i.e., a core of the idea of an idea submission. In a rule-based system, patterns are structured (modeled) to identify grammatical indicators of directive speech-acts in text, in particular, to identify when someone wants someone else to do something, such as in the form of a request, order, proposal, assertion, or question. In the exemplary system, therefore, detecting the core of an idea includes detecting sentences that use particular linguistic patterns for expressing directive illocutionary acts in the context of the participants of the illocutionary act, i.e., the idea owner and/or the organization. Some of the patterns require a dependency with a domain-specific word, while others identify a dependency in which "I" or "me" is the subject.

The following types of linguistic patterns for identifying a core of an idea are exemplary and are provided together with examples in which the patterns are underlined:

1. Performative verb forms: in which a PERFORMATIVE verb (selected from the verbs associated with this concept) has a first person singular ("I") as its subject I suggest/propose/recommend . . . . For example, I suggest that CoffeeCo uses recyclable cups . . . .

2. Idea assertion: a term from the concept IDEA is in a syntactic dependency with a first person singular pronoun ("my"). For example, My next idea is a refreshing fruity drink which I call Applechino 3. Imperative: in which a verb beginning a sentence or clause has a domain-dependent concept (e.g., COMPANY) as its object. For example:

Connect CoffeeCo with a social network website.

Here, the imperative form connect, is in an OBJ-type relationship with CoffeeCo, which is assumed to be in the domain-dependent concept, COMPANY.

4. Conditional: in which any conditional pronoun expression (e.g., conditional verb in a dependency with a pronoun) is also in any syntactic relationship with a domain-dependent concept (e.g., COMPANY).

Also you could sell toys with the CoffeeCo logo on them and the toys could be shaped like coffee cups.

5. Question: in which any main verb of a question in any syntactic relationship with a domain-dependent concept (e.g., COMPANY). For example:

Why has the West $9^{th}$ Street CoffeeCo stopped selling donuts?

6. Need assertion: in which the verb "need" is in any syntactic relationship with a domain-dependent concept (e.g., COMPANY). For example:

I have suggested before that more CoffeeCo Drive-Thru's are needed for people with children or pets that can't park and walk in.

The system may employ two, three four, five or all of these exemplary patterns. These linguistic structures can be encoded by rules in rule-based NLP systems such as in the form of additional rules on top of a parser as described above. In another embodiment, training examples can be annotated for training a machine learning system. In particular, idea descriptions, which may have undergone some initial linguistic processing, have their core idea(s) manually labeled. These samples are used to train a classifier model using a machine learning technique, such as support vector machines (SVM) or linear regression.

The context of the idea-owner can be indicated by any expression where the author of the idea refers to herself or himself (e.g., the pronoun "I", "my", "we", "ours", "our company", etc.).

The context of the organization can be indicated by the organization-specific domain-dependent vocabulary 90. This vocabulary can be obtained by various methods such as calculating term frequency or using glossaries.

An idea core is detected if the words conveying the linguistic pattern and the domain vocabulary are in dependency relationships, like the underlined words in the sentences above. In some cases, more than one idea core may be detected in a single idea submission, in which case, one, such as the first, may be adopted as the idea core, or the user may be asked to select one. In other embodiments, candidate cores may be ranked, with the ranking being based on the order in which the cores were identified in the description and/or on the type of pattern which identified them. In one embodiment, there may be a predefined precedence established among the patterns. For example, the first linguistic pattern matched in the description which is of the performative type or insertion type (direct expressions) may be used as the (main) core, with other identified cores optionally being considered as supplemental core(s). If there is no core identified which is of a direct expression type, then a first idea core identified with one of the other patterns may be selected.

The idea core can be the entire sentence identified as containing the core, or may be less than a sentence, such as the clause of the sentence on which the pattern fired. For each sentence of the description, the idea processing component 64 may output a decision, such as a binary decision, on whether or not the sentence includes a core, based on whether any of the patterns (or classifier) fired on the sentence.

Comment Classification (S108)

In one embodiment, the exemplary system provides automatic linguistic analysis of idea descriptions 38 and free-text comments 44, 46. The automatic analysis supports both facilitators and content-providing users.

The comment classifier 54 automatically labels comments according to their type of reaction to the idea. This facilitates using the classified comments for various analytical purposes and for enhancing the effectiveness of the idea management system 18. The classified comments are each interpreted, when applicable, as the action that the comment represents, and its execution may be supported by the user interface 86 of the system 18. This approach is consistent with the language-action perspective (Winograd, T., "A language/action perspective on the design of cooperative work," Human Computer Interaction, 3(1) 3-30(1987)).

Three exemplary comment classes can be used as follows:

1. Reaction to the content of the idea: this class allows the facilitators of the IMS 18 to enhance the idea submission with additional propositions put forth in the comments, or to categorize the content of the idea submission as existing, e.g., it refers to an idea, product, or service that already exists in the organization (based on the comment).

2. Expression of the commenter's attitude towards the idea: discovering positive or negative attitudes in comments may serve as a complement to an existing voting mechanism or may be used as a voting mechanism itself. For example, a rating may be computed based the comments, e.g., as positive neutral, or negative. In one embodiment, the computed rating is compared with an actual rating of the idea given by the commenter, e.g., the commenter may be requested/permitted to provide a rating 48 of the idea submission. If the computed and actual ratings agree, the actual rating may be labeled as reliable. If the computed rating and commenter's actual rating do not agree, the actual rating may be modified or flagged as unreliable. For example, in FIG. 2, one of the comments "Yes!, why not every week?" is assigned a "positive" rating by the system, but the commenter has only given the idea two stars out of five, which corresponds to fairly negative. Since the actual rating and the computed rating differ by more than a threshold amount, the rating 48 may be flagged as unreliable.

3. Meta-reaction: reaction relative to the idea generation workflow: this category can help provide information about the commenter's reactions regarding the idea status within the IMS workflow.

The automatic categorization of the comments according to the three reaction types can be carried out by various methods. By way of example, a rule-based automatic classification will be described. In this method, each reaction type is defined in terms of a set of linguistic patterns or rules, each rule including linguistic structures and/or associated lexical items/expressions. The linguistic structures mainly convey the comment classes, whereas the lexical items mostly refer to the topic of the comment. The list is definitely not complete but in our experiment, where we tested our proof-of-concept system, the proposed list accounted for a large part of all the reactions.

Exemplary patterns for the three reaction types are listed below. Each reaction type can be further categorized into fine-grained classes (categories) that depend on particular systems. The fine-grained categories in the list apply to a given organization's IMS. The following notation is used in the descriptions:

The words in capital letters represent CONCEPTS that are instantiated by lists of domain-specific and general vocabulary words. Whenever two concepts are mentioned, the words that instantiate them should be in a syntactic dependency relation. The words in italics are lexical items. The content underlined is conveyed by linguistic structures (tense, mood, voice, etc.).

1. Reaction to the Content of the Idea:

This class of comments identifies the commenter's view of the content of idea (e.g., whether it already exists or is similar to an existing idea, or whether it could be changed, e.g., amplified) and can include the following subclasses:

A. PRIOR ART: previous work done/related thing in progress/idea exists. Two types of prior art patterns can be implemented:

i. IDEA/PRODUCT: in which the concept IDEA, PRODUCT, or COMPANY (or other ORGANIZATION concept) is the subject of the verb "exist." For example: a pattern can be of the form:

IDEA/COMPANY exists/has been done/used to exist/was done at some point in the past, e.g.: IDEA or COMPANY subject of the verb "exist".

This pattern could identify a prior art reaction in the text string:

This solution (IDEA) exists within CoffeeCo's marketing department ii. SIMILAR IDEA: an IDEA is similar to something existing. For example, a pattern can be of the form:

a term from the concept SIMILAR in any syntactic relationship with a term from the concept IDEA.

For example this pattern would identify a prior art reaction in the text string:

The Proposal (IDEA) is Comparable (SIMILAR) to what we Tried in North America

B. ADDITIONAL INFORMATION: In this type of comment, the commenter expands the idea (suggestion, question, advice, additional thoughts, request) with his or her own idea, e.g., "Since this is something that we already have, I wonder if it is something that could be centralized." Examples of patterns which can be used to detect this type of comment can be of one or more of the following types:

i. Comparison of IDEAS, in which IDEA is a subject complement of a comparative adjective (selected from a predefined set of comparative adjectives, such as better, improved, worse, nicer, etc.). For example this pattern would identify an additional information in the text string:

This is a better (comparative adjective) proposal (IDEA) than using inflatable cups ii. Conditional, in which any conditional auxiliary verb is present in the sentence. For example:

We could (conditional auxiliary verb) include a coupon for a sample of the new coffee.

iii. An IDEA/COMPANY needs: in which IDEA or COMPANY is in any syntactic relationship with a term from the domain-independent concept LACK. It often suggests something missing from the idea submission, or company, or that the idea submission is not understood. For example:

CoffeeCo (COMPANY) needs (LACK) to make the cups smaller to do this.

iv. Question: the comment is in the form of a question. For example:

Why doesn't CoffeeCo try this in the North East?

v. imperative: the comment is in the imperative form. For example:

Try this!, Do this, or Go and see this webpage vi. I SUGGEST—my SUGGESTION: in which the first person pronoun is in any syntactic relationship with a term from the domain-independent concept SUGGESTION. For example:

I suggest that we also add a logo to the cup.

2. Expression of the Commenter's Judgment of the Idea's Value

Here, the commenter is not trying to change the content, but evaluate the comment. This class can include different types of evaluative comments.

Some expressions can be classified into positive and negative categories using a sentiment vocabulary and/or patterns. A sentiment vocabulary classes certain words as being positive or negative and may assign a value on a scale of positive/ negative. For example, fabulous, may be classed more positive than nice. In some embodiments, a set of positive terms in the sentiment vocabulary is collected into a domain independent concept GOOD and optionally a set of negative terms is collected in a domain independent concept BAD. In other embodiments, the company may only be interested in judgments that are supportive of the idea (e.g., using the concepts GOOD, AGREE), and thus negative judgments may be ignored (or vice versa). Words of negation usually reverse the polarity, for example, not very good, is classed as negative. Example judgment subclasses may be as follows, although more or less refined subclasses are also considered, such as simply positive and negative.

A. AGREE (e.g., "True, I support this idea."). Two patterns are suggested:

i. I agree/support: in which a verb in the domain-independent concept AGREE is in any syntactic relationship with a first person pronoun. For example.

I agree that we need to focus on this.

ii. AGREE adverb beginning the sentence. An adverb in the domain-independent concept AGREE is present at or near the beginning of the sentence. For example:

Perfectly described!

B. POSITIVE ATTITUDE Two patterns are suggested:

i. GOOD IDEA: A word in the domain independent concept GOOD precedes a word in the domain independent concept IDEA. For example:

Great idea, Kelly.

ii. the comment includes an expression from a lexicon of specific expressions that are recognized as connoting a positive attitude, e.g., Sounds good/makes sense. The pattern fires when the specific words themselves are used. For example:

This makes sense to me.

C. NEGATIVE ATTITUDE Two patterns are suggested:

i. BAD IDEA: A word in the domain independent concept BAD precedes a word in the domain independent concept IDEA. For example:

Bad idea, Bob ii. Negation in the sentence: Patterns which use the word not, particularly in a pattern which would otherwise be an indicator of a positive attitude, such as:

This is not the kind of savings/revenue idea that we are looking for.

This is not a very good idea

D. PROS-CONS arguments for and against the idea. Two patterns are suggested:

i. Yes . . . but/ . . . , however/while . . . . For example:

Yes we can use WebEx or Live Meeting, but it only displays our computer screen.

we can use WebEx or Live Meeting, however it only displays our computer screen.

ii POSITIVE ATTITUDE+but For example:

We could introduce this next year, but I don't expect it will be ready

3. Meta-Reaction: Reaction Relative to the Idea Generation Workflow

The comment concerns the management of the process for implementing a product/process that is the focus of the idea (e.g., "Rating—Hold until 2010"). Depending on the stage at which the process is currently, the idea may need to wait to be implemented, could be implemented on a trial basis, or could be ready for implementing now. A pattern identifies when a term in the domain-specific concept PROCESS is in the sentence. The concept PROCESS is a vocabulary of company-specific processes for ideas.

The comment classification component 66 can be implemented by applying pattern-matching rules. Alternatively a collection of training examples can be used as annotated examples for training a machine-learning system.

Comment sentences which satisfy one of the patterns are labeled with the class corresponding to that pattern, and optionally, more fine-grained tags corresponding to the particular pattern(s) that fired.

While three comment classes are described by way of example, it is to be appreciated that fewer or more comment classes may be employed for identifying different types of comments. The number of different comment classes may depend, in part on the available interpretation methods. The system may employ two, three four, five, or more, or all of the exemplary patterns described above, such as at least one for each class.

The comment classification may have a specific goal within the community, which depends on the type of innovation community. For example, a community of employees typically deliberates on innovative projects that the company should invest in, while a customer community typically deliberates on the next line of products that they want. The set of fine-grained reaction types may be modified to be appropriate to the particular community goal. In the case of a community of employees seeking novel and promising ideas, one aspect of the comment classification is to identify prior art, if there is any, in the idea content. In the case of a customer community, patterns for identifying existing products/services may not be needed. However, two of the three main reaction types, "Reaction to the content of the idea" and "Expression of the commenter's judgment of the idea" are largely system independent. As for the "Meta-reaction" type, it may be present whenever formal idea-management steps are defined in the system.

The set of fine-grained classes (categories) may be customizable for the specific community, since the reaction types depend on the community goals. Thus, some comment classes/subclasses can change. That is, as a new corpus is given, the classes and list of reactions can be adapted based on the goal and content of this system.

It has been found that a set of about 40 or 50 pattern matching rules of the type described above are sufficient to generate a practical system for classifying comments, although a larger number or rules could allow a higher precision or retrieval to be achieved.

The classification of the comments, as reactions to ideas, into three classes, as described herein, has several benefits. First, in logical terms, the classification distinguishes three distinct aspects of the idea that can be targeted by the commenter's reaction: idea content, idea value, or idea state with respect to a given workflow. Second, in terms of tools that a social media platform can include, the classification corresponds to distinct types of technologies: for the first class, the IMS may include content generation and management tools (e.g., wikis, document editors, tagging tools), for the second class, the IMS may include tools for judging the value of ideas (e.g., tools for voting, deliberation, sentiment analysis), and for the third class, the IMS may include tools for managing processes (e.g., planning or workflow systems).

The classification of three basic comment types logically maps onto three basic actions types that an idea-generating social media platform can recommend. For example, detecting the reaction to the idea content leads to recommending actions aimed at content generation and management. Detecting the commenter's attitude towards the idea value leads to recommending actions aimed at voting and deliberating on what idea to select. Detecting reaction to the process leads to recommending actions aimed at managing the idea state or process with respect to a given workflow.

Comment Interpretation and Action Recommendation (S110)

Several of the comments found in an idea-generating social media platform are aimed at performing specific actions. The number of these actions is usually limited, given the specific and shared goal of the platform. For example, ADDITIONAL INFORMATION aims at refining the idea by adding new content or a clarification. PRIOR ART aims at appending a reference to prior work or ideas to the content of the current idea. Accordingly, after classifying each comment, the interpretation component 68 may recommend, to the user, e.g., commenter 28 or reviewer 84, the inception or full execution of a corresponding action.

Figure 5:
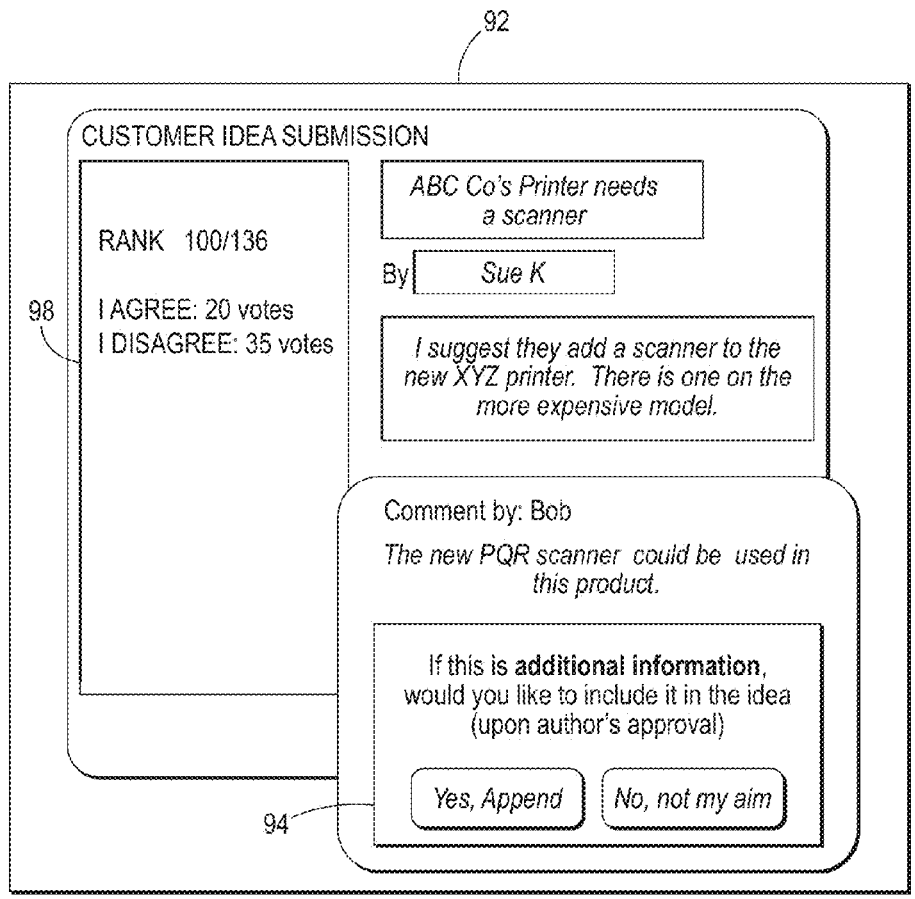
FIG. 5 illustrates a screen shot of a graphical user interface which displays a pop up when the system determines that the comment is concerning additional information.
Figure 6:
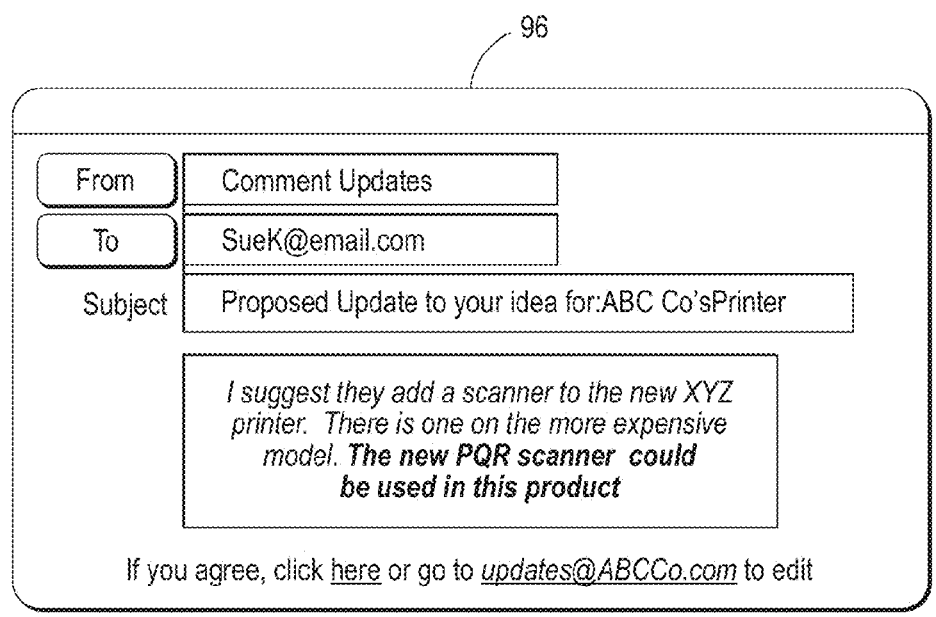
FIG. 6 illustrates a message to the author of the idea submission proposing a modification to the idea description.

For example FIG. 5 illustrates a screenshot of an exemplary user interface 92, which may be displayed on the commenter's display device. By application of the patterns, the comment classifier has classified the comment as a case of an ADDITIONAL INFORMATION (ADDID). As the commenter submits the comment to the idea "Automation of Creating . . . ", the comment is classified by the classification component as an ADDID. The interpretation component 68 then asks the commenter via a dialog box 94 if the user would like to execute the action of appending the content of the comment to the description of that idea. If the user clicks the button "Yes, append", then the system may let the user choose the point of the description where the comment should be appended. The illustrated dialog box is an embodiment of the action recommendation with which the user interacts by accepting or rejecting it. After the user responds, the system sends a request 96 (FIG. 6) to the author of the idea (and/or moderator) to either accept or reject the edit or addition proposed. Various ways for requesting confirmations of the proposed change can be implemented, e.g., through a version manager such as in the github.com code management system.

A similar procedure can be implemented for a comment classified as PRIOR ART: if related ideas are mentioned, the system can suggest that the two ideas are related. This is another embodiment of action recommendation, which the user can accept or reject.

For POSITIVE ATTITUDE or AGREE comments the commenter may be given the option of giving a positive vote (e.g., a thumbs up or a positive value on a rating sale) to the idea and for NEGATIVE ATTITUDE, a negative vote (e.g., a thumbs down or negative value on a rating sale). In other embodiments, the vote may automatically be generated. The vote is added to the votes previously cast by other commenters and may be displayed in a voting region the interface, as illustrated at 98. The voting information may be forwarded to a person/department associated with evaluating the comments.

In the case of process related comments, each of a plurality of the PROCESS terms may be associated with a respective specific action, for example, comments including the PROCESS term "implement now" may be forwarded to a department tasked with the process of implementing the product or service.

Information Output (S112)

A. Comment Classification

In the case of comment classification, the information output may be an assigned comment class for each comment (where none of the three example classes is assigned, the comment may be assigned to an "unclassified" class). Alternatively or additionally the information output may be a request to append, or automatically appended comment or part thereof, in the case of a comment assigned to the first class, or a vote/rank or request for a vote/rank, or other scoring metric, in the case of a comment assigned to the second class.

In other embodiments, the information output may be the number or proportion of the comments assigned to each class. In other embodiments, a reviewer may request to see all submission in a given one or more of the classes/subclasses, and this information may be output.

B. Idea Spotting

Figure 7:
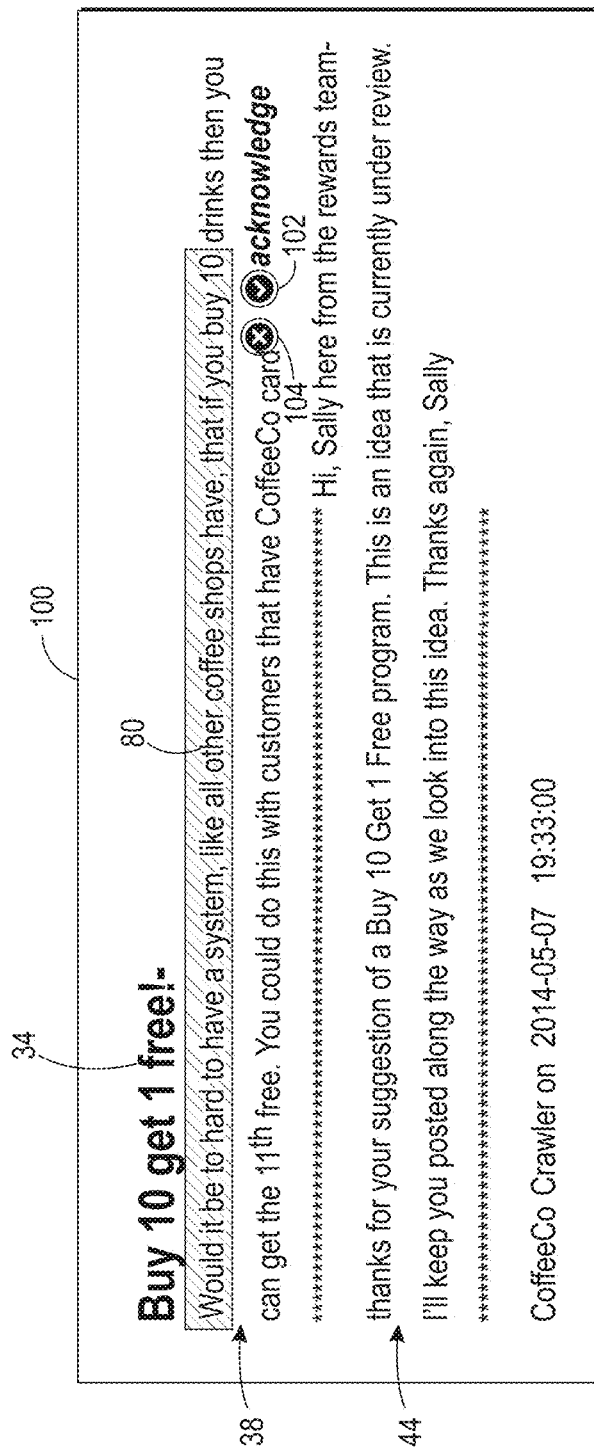
FIG. 7 is a screenshot illustrating the automatic highlighting of an identified idea in an idea submission.
Figure 8:
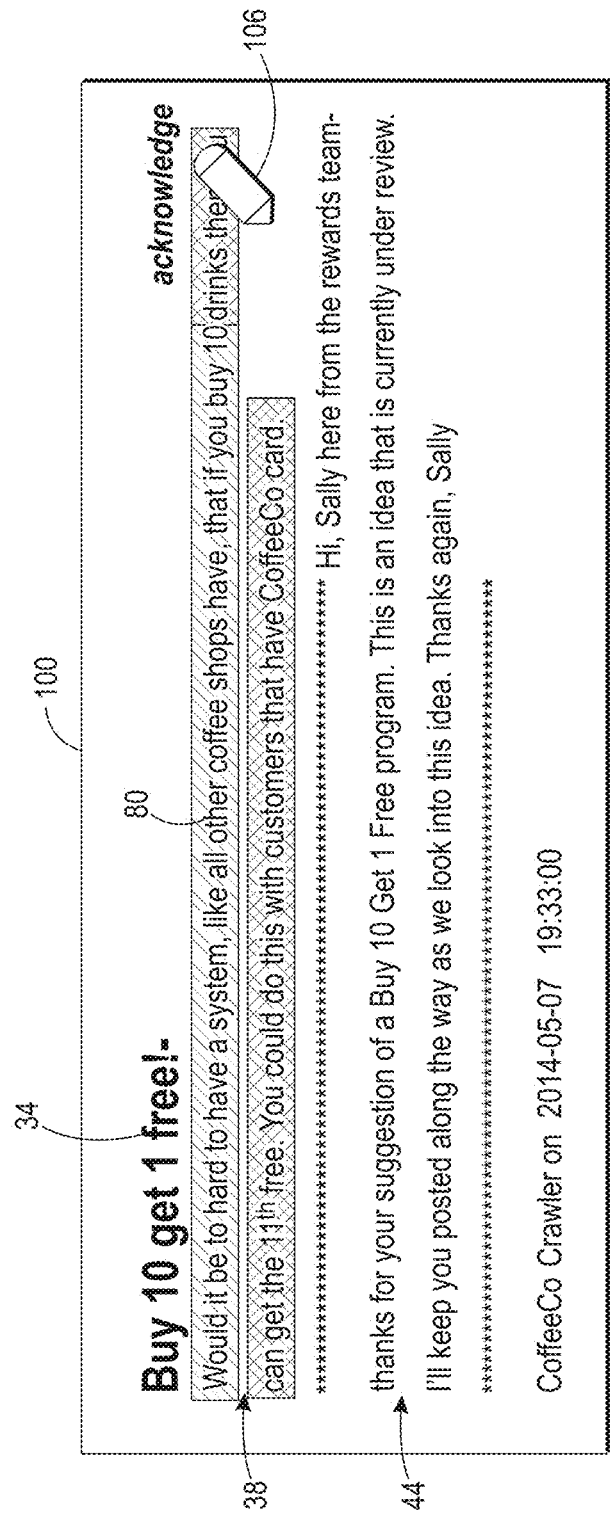
FIG. 8 is a screenshot illustrating user modifications to the highlighting of an identified idea in an idea submission.

In the case when the idea core is identified at S106, this may be output and/or proposed at S112 as a replacement title for the submission. The output component 70 may include an interactive visualization component that generates a Graphical User Interface (GUI) 100 for display to a user on a client device, as illustrated, for example, in FIGS. 7 and 8. The GUI visualizes the identified idea core(s) 80, allows the user to validate them, and the validated cores are then visualized as validated for future use (with a stored history of validation). The GUI may allow the user to modify, remove, and/or add a new core(s) manually. For example, the user interacts with the GUI using a user input device of the client device 14, 16, 86, such as a keyboard, keypad, touch screen, cursor control device, or combination thereof. Where more than one idea core is identified, a single one may be output, or a set of idea cores may be displayed in a ranked order on the GUI, with the opportunity for the user to select one. In one embodiment, the automatically identified core(s) may be highlighted in the description, as shown in FIG. 7. The user can click on an "accept" 102 or a "decline" 104 actuable area of the screen, or employ other suitable selection mechanism. In the illustrated example, the user has declined the highlighted entry, allowing the user to select a new idea core or to modify it. As shown in FIG. 8, the user has opted to modify the identified core by including additional text of the idea description. A highlighting pen may be automatically displayed, as shown at 106, for the user to make the text selection.

The exemplary system and method are particularly useful in organizations interested in pursuing open innovation independently or collaboratively, where a large number of ideas and comments may be generated by employees, customers, or the like.

Without intending to limit the scope of the exemplary embodiment, the following Examples illustrate the applicability of the methods disclosed herein for idea spotting and comment classification.

EXAMPLES

Example 1

Idea Core Spotting

A prototype system was developed for detecting ideas in an Idea Management System for a company operating a number of coffee shops. The linguistic patterns for the idea processing component 64 were encoded in XIP rules, and the domain-specific vocabulary was constructed manually, based on a development corpus. The development corpus consisted of 681 idea postings by customers. About 40 rules were manually generated using 50 words of domain-specific vocabulary (including the name of the company, its abbreviated forms, and the like). When these rules were on 21,000 postings the system detected 15,000 idea cores. The performance was manually evaluated on 50 postings, and achieved 75% recall and 93% precision.

Example 2

Comment Classification

An idea classifier was developed for a company IMS that is used by employees. 281 comments submitted in connection with idea submissions were analyzed first. For this evaluation, the submitted ideas were ignored. From this initial review, it was found that the comment classes, as listed below, were expressed in the first sentence of the comment in 88% of the comments. Out of the remaining 12% of comments, in 8%, no comment type could be identified in the entire comment text and in 4%, the comment type was expressed later in the text. Based on this analysis, it was decided to analyze the first sentences only. While this approach means that the method misses 4% of the comment types, there is a gain in precision and relevance if only the first sentence is considered.

Based on 285 comments, a domain vocabulary of approximately 140 words and about 50 pattern-matching rules were constructed. The resulting grammar was run on 3000 comments, out of which 2000 (70%) were classified.

48 of the comments that were classified by the system were evaluated. The comments (first sentence only) and respective classification labels assigned by the system were presented independently to two human coders to assess inter-annotator agreement. They fully agreed in 81% of the cases, partially agreed in 12.5% of the cases (one evaluator agreed with the system classification, the other did not), and both disagreed in 6.3% of the cases. The Kappa value (removing the effect of chance) was 0.81. In those cases were there was agreement between the two human annotators, there was agreement with the automatic classification in 87% of the cases, and partial agreement and disagreement in 6.3%. The Kappa value was 0.87.

Finally, the linguistic processor 62 and classifier 66 were applied to a dataset of 1078 ideas in the organization, which received 2984 comments by 598 authors (73% of the ideas had at least one comment). The comment classification results were as follows:

ADDITIONAL INFORMATION: 19%
PRIOR ART: 9%
POSITIVE ATTITUDE: 17%
AGREE: 5%
NEGATIVE ATTITUDE: 2%
PROS-CONS: 4%
PROCESS: 12%
UNCLASSIFIED 26%

Therefore, a total of 28% of the comments conveyed a reaction to the content, 28% expressed a judgment about the value of the idea, 12% were devoted to managing the process, while the rest of the comments remained unclassified.

Some of the comments classified as "unclassified" may, in fact be noise, such as "thankyou," or "hello", so the unclassified comments can be filtered out. Further patterns may decrease the percentage of unclassified comments.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for classifying comments on an idea submission, comprising:
receiving a collection of textual comments from users, each of the comments in the collection comprising text in a natural language and annotating an idea submission, previously-submitted by another user, which includes a description of an idea;
for each of a plurality of comment classes, providing at least one pattern for assigning a textual comment to the class based on the occurrence of a specified syntactic relation in the comment, the comment classes including:
a first class for reaction to the content of the idea,
a second class for expression of a commenter's judgment of an idea's value, and
a third class for reaction to an idea generation process in which the associated idea submission is made, the at least one pattern for the third class comprising a pattern which identifies when a term in the comment which is in a set of terms designated as being associated with a domain-specific PROCESS concept is present in a comment sentence;
natural language processing each of the comments to identify dependencies in at least a part of the comment;
based on the identified dependencies, automatically classifying the comments according to the plurality of comment classes, the classifying including applying the at least one pattern for identifying comments that are assigned to the third comment class;
wherein when the comment is assigned to the first class, the method further includes proposing appending at least a part of the comment to the description of the associated idea submission;
wherein when the comment is assigned to the second class, the method further includes providing for rating the idea submission; and
outputting information based on the assigned comment classes,
wherein the natural language processing, classifying, and outputting are performed with a computer processor.

2. The method of claim 1, wherein the comment classes comprise at least three comment classes.

3. The method of claim 1, wherein the first comment class includes:
a prior art subclass for comments related to at least one of previous work done, a related thing in progress, and an idea that the comment identifies as previously existing; and an additional information subclass for comments in which a commenter expands on the idea expressed in the associated idea submission with another idea.

4. The method of claim 1, wherein the classifying includes applying patterns for identifying comments that are assigned to the first comment class, the patterns comprising at least two of:
   a prior art pattern for detecting existing ideas which detects when a term in the comment is the subject of the verb "exist" and in which the term is in a set of terms designated as relating to an IDEA concept or is in a set of terms designated as relating to an ORGANIZATION concept;
   a prior art pattern for detecting similar ideas which detects when a term in the comment which is in a set of terms designated as relating to a SIMILAR concept is in a syntactic relationship with a term which is in the set of terms designated as relating to the IDEA concept;
   an additional information pattern for detecting comparison of ideas which detects when a term in the comment which is in the set of terms designated as relating to the IDEA concept is a subject complement of a comparative adjective;
   an additional information pattern for detecting conditional expressions, which detects when the comment includes a conditional auxiliary verb;
   an additional information pattern for detecting a need of an idea or organization, which detects when a term in the comment which is in the set of terms designated as relating to the SIMILAR concept or to the ORGANIZATION concept is in a syntactic relationship with a term which is in the set of terms designated as relating to a LACK concept;
   an additional information pattern which detects when the comment is in a form of a question;
   an additional information pattern which detects when the comment is in an imperative form; and
   an additional information pattern for detecting personal suggestions which detects when a first person pronoun is in a syntactic relationship with a term in the comment which is in the set of terms designated as relating to a SUGGESTION concept.

5. The method of claim 1, wherein the second comment class includes at least one of:
   a first subclass related to at least one of agreement and disagreement with the idea;
   a second subclass related to at least one of positive and negative attitude to the idea; and
   a third subclass related to at least one of pros and cons of the idea.

6. The method of claim 1, wherein the classifying includes applying patterns for identifying comments that are assigned to the second comment class, the patterns comprising at least two of:
   a pattern for detecting agreement which detects when a verb in the comment is in a set of terms designated as relating to an AGREE concept is in a syntactic relationship with a first person pronoun;
   a pattern for detecting agreement which detects when an adverb in the comment is in the set of terms designated as relating to the AGREE concept is in a syntactic relationship is present at a beginning of a comment sentence;
   a pattern for detecting positive attitude which detects when a term in the comment which is in a set of terms designated as relating to an GOOD concept precedes a term which is in a set of terms designated as relating to an IDEA concept;
   a pattern for detecting negative attitude which detects when a term in the comment which is in a set of terms designated as relating to an BAD concept precedes a term which is in a set of terms designated as relating to an IDEA concept;
   a pattern for detecting negative attitude which detects when negation is used in a comment sentence;
   a pattern for detecting positive attitude which detects when the comment includes an expression from a lexicon of specific expressions that are recognized as connoting a positive attitude;
   a pattern for detecting pros and cons in which a first clause beginning with "yes" precedes a second clause beginning with "but", a first clause precedes second clause beginning with "however", or a clause begins with "while"; and
   a pattern for detecting pros and cons in which a pattern for detecting positive attitude is met by a clause of a comment which precedes "but".

7. The method of claim 1, wherein for each of the comment classes, the classification comprises applying at least one pattern for identifying comments that are to be assigned to the respective comment class.

8. The method of claim 1, wherein for each of the comment classes, the classification comprises applying a classifier which has been trained on a set of sample comments that are each manually labeled with at least one of the respective comment class and a subclass of the comment class.

9. The method of claim 1, wherein the classification comprises accessing a vocabulary comprising, for each of a set of domain dependent concepts, a respective set of terms, and for each of a set of domain independent concepts, a respective set of terms and applying patterns for classifying the comments including patterns which each specify at least one of the domain dependent and domain-independent concepts.

10. The method of claim 9, wherein at least some of the patterns specify a dependency between two of the concepts.

11. The method of claim 1, further comprising interpreting the comment based on the assigned class.

12. A computer program product comprising a non-transitory recording medium storing instructions, which when executed on a computer causes the computer to perform the method of claim 1.

13. A system comprising memory which stores instructions for performing the method of claim 1 and a processor in communication with the memory for executing the instructions.

14. A system for classifying comments, comprising:
   a data repository which stores:
      previously-submitted idea submissions, each of the idea submissions including a description of an idea, and
      a collection of comments on the ideas, each of the comments in the collection comprising text in a natural language and being associated with one of the previously-submitted idea submissions;
   a linguistic processing component which natural language processes each of the comments in the collection of the comments to identify dependencies in at least a part of the comment;
   a comment classification component which classifies the comments into a plurality of predefined comment classes based on the identified dependencies and labels the comments according to the comment classes, the comment classes including:
      a first class for reaction to the content of the idea,
      a second class for expression of a commenter's judgment of an idea's value, and a third class for reaction to an idea generation process in which the associated idea submission is made, the at least one pattern for identifying comments that are assigned to the third comment class comprising a pattern which identifies when a term in the comment which is in a set of terms designated as being associated with a domain-specific PROCESS concept is present in a comment sentence, the classifying including applying the at least one pattern for identifying comments that are assigned to the third comment class;

a comment interpretation component which, when the comment is assigned to the first class for reaction to the content of the idea, proposes appending at least a part of the comment to the description of the associated idea submission, and when the comment is assigned to the second class for expression of a commenter's judgment of an idea's value, provides for rating the idea submission;

an output component which outputs information based on the assigned comment classes; and a processor which implements the a linguistic processing component, comment classification component, and output component.

15. The system of claim 14, further comprising memory which stores, for each of a set of domain-dependent concepts, a respective set of terms, and for each of a set of domain-independent concepts, a respective set of terms, the comment classification component applying patterns for classifying the comments including patterns which each specify at least one of the domain-dependent and domain-independent concepts.

16. A method for generating a system for classifying comments, comprising:
  storing a set of terms in non-transitory memory for each of a set of domain dependent concepts and a set of terms for each of a plurality of domain-independent concepts, the domain-independent concepts including at least some of:
    IDEA, and wherein the terms include at least some of: idea, suggestion, proposition, proposal, concept, thought, brainwave, notion, initiative, plan, and inspiration;
    SIMILAR, and wherein the terms include at least some of: another, related, same, similar, and comparable;
    PROCESS, and wherein the terms include at least some of: accept, assign, process, hold, and administer;
    AGREE, and wherein the terms include at least some of: agree, concur, right, yes, perfectly, and agreement;
    DISAGREE, and wherein the terms include at least some of: disagree, differ, oppose, wrong, no, and disagreement;
    LACK, and wherein the terms include at least some of: need, require, lack, want, and should;
    SUGGESTION, and wherein the terms include at least some of: suggest, advise, add, propose, submit, put forward, recommend, and suggestion;
    GOOD, and wherein the terms include at least some of: good, lovely, splendid, wonderful, cool, fantastic, great, decent, useful, excellent, and clever;
    BAD, and wherein the terms include at least some of: bad, poor, awful, terrible, flawed, rotten, and unpleasant;
  for each of a plurality of comment classes, generating at least one pattern for assigning a textual comment on an idea submission to the class based on the occurrence of a specified syntactic relation in the comment, at least some of the patterns specifying that a term in one of the domain-dependent or domain-independent concepts be a syntactic relation with another term in the comment, the comment classes including:
    a first class for reaction to the content of the idea,
    a second class for expression of a commenter's iudgment of an idea's value, and
    a third class for reaction to an idea generation process in which the associated idea submission is made, the at least one pattern for identifying comments that are assigned to the third comment class comprising a pattern which identifies when a term in the comment which is in a set of terms designated as being associated with a domain-specific PROCESS concept is present in a comment sentence;
  storing the patterns in non-transitory memory for application to textual comments by a comment classification component which automatically classifies the comments according to the plurality of comment classes based on dependencies identified in at least a part of the comment, the classifying including applying the at least one pattern;
  providing for proposing appending at least a part of the comment to the description of the associated idea submission when the comment is assigned to the first class;
  providing for rating the idea submission when the comment is assigned to the second class; and
  wherein the storing terms and storing patterns are performed with a computer processor.

* * * * *